United States Patent [19]

Dimeff

[11] 4,300,402
[45] Nov. 17, 1981

[54] FLOW MEASURING NEEDLE AND ORIFICE FOR FLOW METER

[76] Inventor: John Dimeff, 5346 Greenside Dr., San Jose, Calif. 95127

[21] Appl. No.: 95,131

[22] Filed: Nov. 16, 1979

[51] Int. Cl.³ .............................................. G01F 1/22
[52] U.S. Cl. ............................................... 73/861.54
[58] Field of Search ............ 73/861.53, 861.54, 861.58

[56] References Cited

U.S. PATENT DOCUMENTS

| | | | |
|---|---|---|---|
| 2,210,081 | 8/1940 | Humphrey | 73/861.54 |
| 2,244,552 | 6/1941 | Delany | 73/861.54 |
| 4,007,628 | 2/1977 | Worcester | 73/861.58 |
| 4,064,751 | 12/1977 | Deisenroth et al. | 73/861.53 |

*Primary Examiner*—Herbert Goldstein

[57] ABSTRACT

A remote volume flow meter is disclosed in which a variable density optical filter attached to a moving diaphragm indicates flow by filter position. The diaphragm has a hole, which hole travels along a needle. The needle is mounted to the housing via a needle stem. Excursion of the diaphragm at the hole occurs against a spring force. Upon movement against this spring force the diaphragm hole sees a changing area defined by the needle. Typically, the needle is of overall cylindrical configuration with one or more linearly tapering grooves extending from one end of the needle to another end of the needle. These grooves taper from a small interruption of the cylindrical cross-section at the low mass flow rate end of the needle to a large interruption of the cylindrical cross-section of the needle at the high mass flow rate end of the needle. Centrally of the needle and protruding to the high flow rate end of the needle there is provided a threaded adjustment needle. This adjustment needle is for advancement into the deepest portion of the tapering grooves.

16 Claims, 11 Drawing Figures

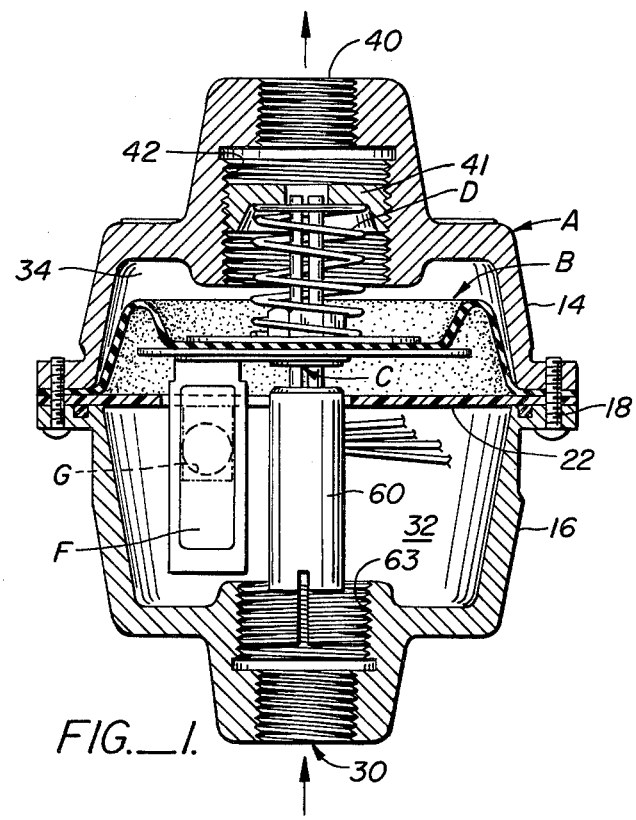
FIG._1.
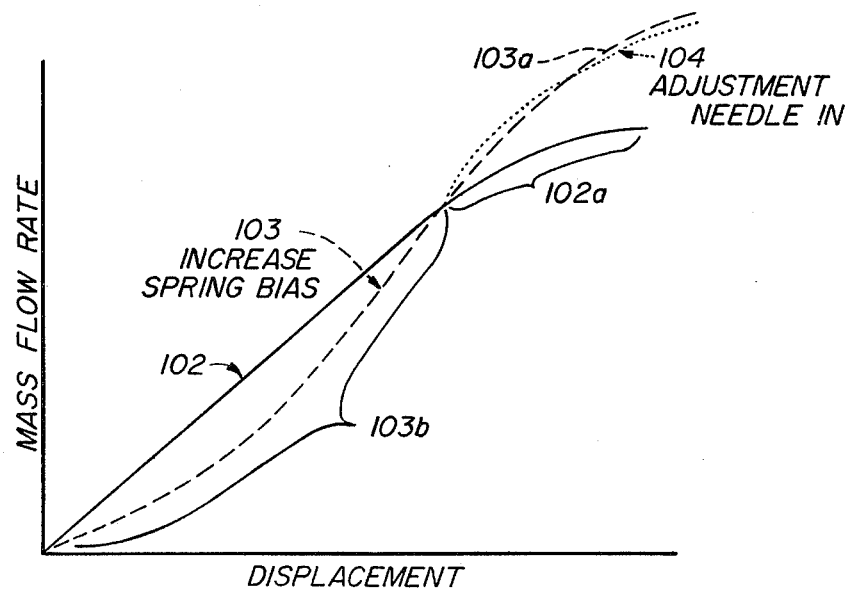
FIG._6.

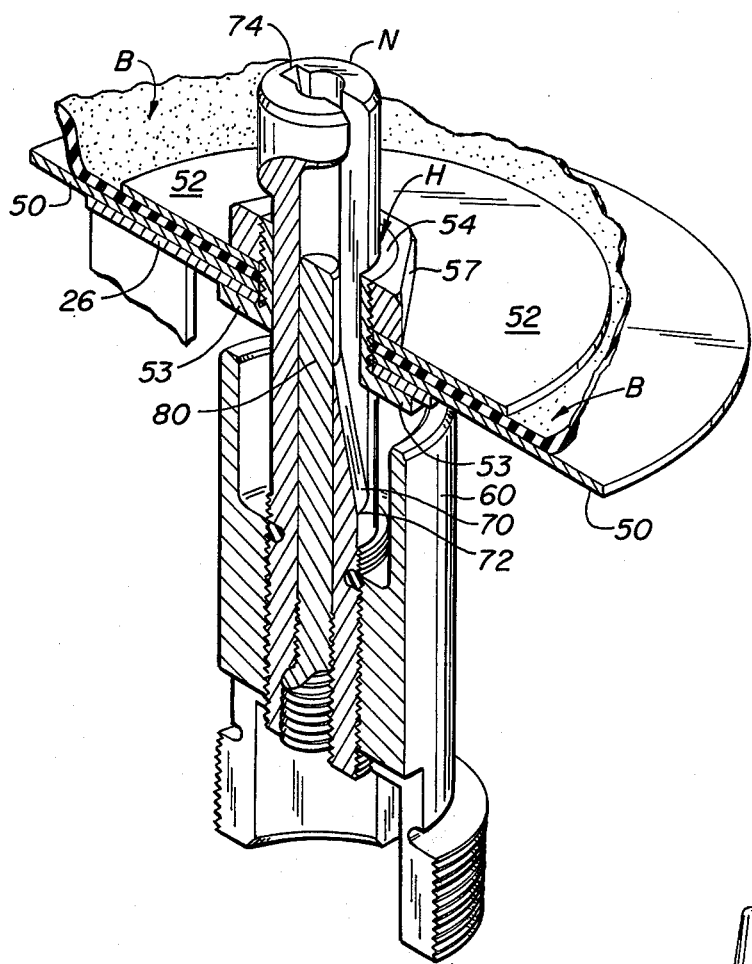
FIG._2.
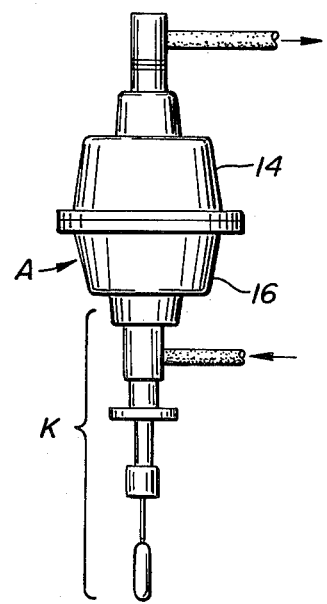
FIG._7.

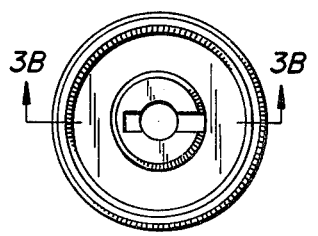
FIG._3A.
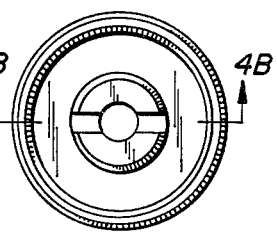
FIG._4A.
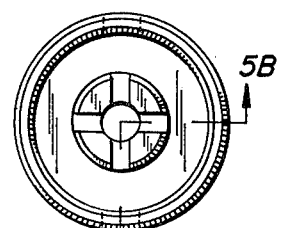
FIG._5A.
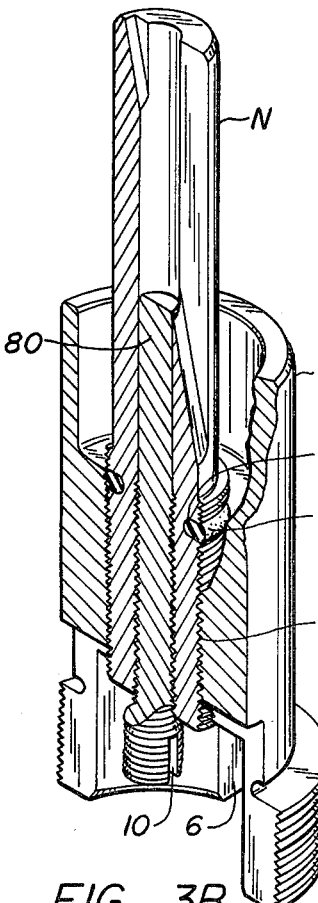
FIG._3B.
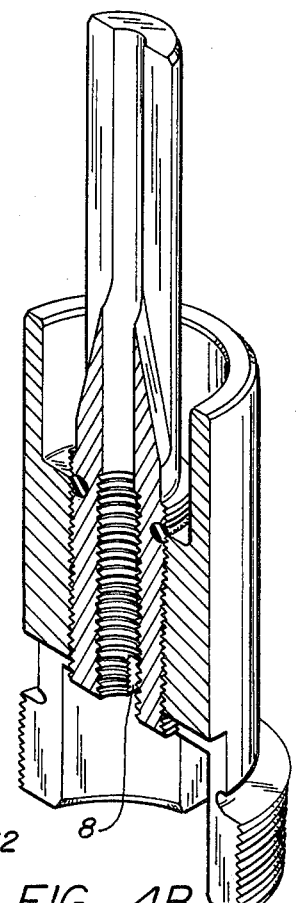
FIG._4B.
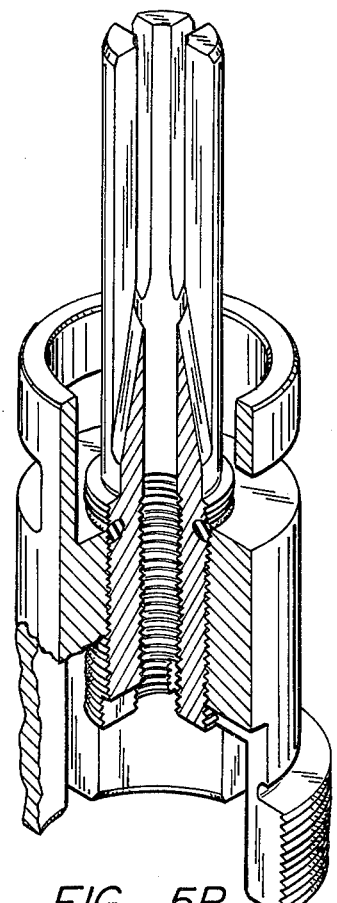
FIG._5B.

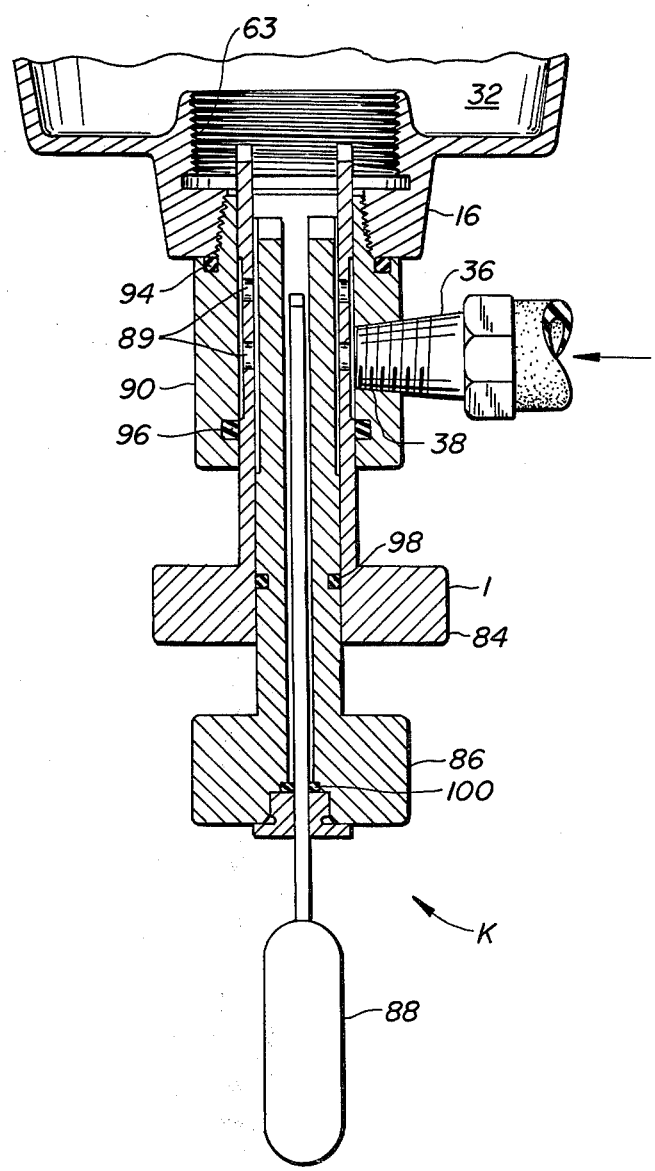
FIG._8.

FLOW MEASURING NEEDLE AND ORIFICE FOR FLOW METER

This invention relates to an improved flow meter wherein an aperture diaphragm coacts with a needle to define an aperture of changing cross sectional area upon excursion of the diaphragm at the aperture along the length of the needle.

SUMMARY OF THE PRIOR ART

Remote flow meters for monitoring air leakage in communication cables are known. These meters have a diaphragm with a hole therein, which hole coacts with a needle. Diaphragm movement along the length of the needle defines an aperture of changing area. Typically, the diaphragm movement is actuated by air pressure against a spring bias. Position of the diaphragm is, hopefully, linearly related to the desired mass flow rate.

It will be understood that where such flow meters are used to measure mass flow rate of air to a pressurized cable sheath on a communication cable, it will be realized that every pound of pressure that is passed on to the cable sheathing will improve the ability to resist moisture penetration. Where there is a large pressure drop at the meter and a concomitant large reduction of the pressure in the cable sheathing, there is a reduced protection against moisture penetration.

It is especially to be noted that readings of pressure drop in communication cable sheathing become most important at high mass flow rates. Since high mass flow rates indicate breakdown of the protective cable sheathing system, accuracy in measuring the flow rates enable precise and swift location of sheathing leaks. It can therefore be understood that having the greatest inaccuracy at high mass flow rates can reduce the effectiveness of a mass flow rate meter for assisting in the location of cable leaks.

As relevant prior art in such flow meters, the reader's attention is directed to Worcester U.S. Pat. No. 4,007,628 entitled REMOTE FLOW TRANSDUCER FOR COMMUNICATION CABLE, issued Feb. 15, 1977. Additionally, and for a disclosure of the type of needle utilized with this invention, attention is directed to Delaney U.S. Pat. No. 2,244,552, issued June 30, 1951, and Mitchell U.S. Pat. No. 3,073,349, entitled FLUID METERING DEVICE, issued Jan. 15, 1963.

SUMMARY OF THE INVENTION

A remote volume flow meter is disclosed in which a variable density optical filter attached to a moving diaphragm indicates flow by filter position. The diaphragm has a hole, which hole travels along a needle. The needle is mounted to the housing via a needle stem. Excursion of the diaphragm at the hole occurs against a spring force. Movement continues until the pressure force across the diaphragm that results from air flow through the restricted channel way in the needle is just sufficient to balance the spring force. Upon movement against this spring force the diaphragm hole sees a changing area defined by the needle. Typically, the needle is of overall cylindrical configuration with one or more linearly tapering grooves extending from one end of the needle to another end of the needle. These grooves taper from a small interruption of the cylindrical cross-section at the low mass flow rate end of the needle to a large interruption of the cylindrical cross-section of the needle at the high mass flow rate end of the needle.

Centrally of the needle and protruding to the high flow rate end of the needle there is provided a threaded adjustable needle. This adjustable needle is for advancement into the deepest portion of the tapering grooves. The adjustable needle allows tailoring of the high mass flow rate end of the needle to permit an adjustment to the desired high flow relationship between mass flow rate and diaphragm displacement thus allowing the desired relationship to be preserved from lift-off and low mass flow rate to maximum diaphragm displacement and high mass flow rate. Additionally, the needle stem, housing, and needles are configured so that adjustment of the invention may be made with actual flow occurring through the valve using a calibration assembly.

OTHER OBJECTS, FEATURES AND ADVANTAGES

An object of this invention is to disclose an improved needle for coacting with an aperture diaphragm to produce linearity in the mass flow rate with respect to diaphragm displacement. According to this aspect of the invention, the needle is given a cylindrical configuration. This cylindrical configuration is interrupted along the length of the needle by one or more tapering slots. Each slot begins at the low mass flow rate end of the needle at a shallow depth and tapers to a large depth at the high mass flow rate end of the needle. Preferably, the slot is linear. Adjacent the slot and penetrating into the slot, there is provided a second and smaller member. This member penetrates typically coaxial of the needle into the slot at the high mass flow rate portion of the needle. An improved linearity in the diaphragm displacement with respect to the mass flow rate results.

An advantage of the slot and needle of this invention is that a tailoring of the displacement curve can be provided each meter. By the expedient of individually adjusting the penetration of the inner needle into the defined slot, a predictable and repeatable linear function of diaphragm displacement to mass flow rate can be generated.

An additional advantage of the tailoring of the high mass flow rate end of the needle is that adjustments to the mass flow rate curve does not have to be made by increasing spring bias allowing that adjustment to be made specifically as required to establish the proper position of the spring at zero flow rate, rather than adjusting it's position at a compromise position as determined by the combined necessity of adjusting both zero flow and full scale flow. Where spring bias is not increased, improved linearity of diaphragm displacement to mass flow rate occurs at low mass flow rates. Thus distortion in the performance of mass flow rates is avoided at or near meter lift-off where only low flow rates are measured.

A further advantage of the disclosed needle and aperture is that reversals of flow paths are held to a minimum. Generated velocity head in the passing air stream does not distort diaphragm position imparting additional non-linearities to the mass flow.

A further object of this invention is to disclose a meter configuration wherein needle adjustment can be individually made all the while a mass flow meter is being operated. According to this aspect of the invention, the needle stem, which holds the concentric needles, is initially positioned to provide a zero flow rate reading the variable density optical filter. Thereafter, and for individual selected flow rates, the needle and the concentric adjustment needle are individually positioned to give repeatable mass flow rates through individual adjustment of the flow meters.

Another object of the invention is to provide a calibration assembly which is mounted to the meter so that the needle stem and the concentric needles can be adjusted in their operational configuration.

This aspect of the invention allows each individual meter to be easily, quickly and accurately adjusted while operating.

A further object of this invention is to disclose needle configurations covering a wide variety of mass flow rates in cylinders of constant diameter. According to this aspect, the cylinders are provided with a plurality of grooves. The grooves are aligned so that common penetration of an adjusting needle valve can occur.

An advantage of this aspect of the invention is that full scale flow range can be altered by large factors by increasing the number of grooves and dimension of the grooves; for example, in the constructed sample of the invention flow rates varying from ten cubic feet per hour to a hundred and fifty cubic feet per hour can all be accommodated by the same dimension of needle and aperture.

Other objects, features and advantages of this invention will become more apparent after referring to the following specification and attached drawings in which:

FIG. 1 is a side elevation in section illustrating the diaphragm valve of this invention;

FIG. 2 is an illustration of the diaphragm at its aperture coacting along the needle;

FIGS. 3a and 3b are respective end views and perspective cut away views of the single slotted needle according to this invention;

FIGS. 4a and 4b are end views and perspective cut away sections of a double slotted needle according to this invention;

FIGS. 5a and 5b are end views and perspective cut away sections of a needle having four slots in accordance with this invention;

FIG. 6 is a graphic indication of the flow rate of this invention;

FIG. 7 illustrates the device used to adjust calibration of the flow meter as it would be attached to the entry housing of a flowmeter; and FIG. 8 is a cross-sectional view of the calibration adjustment assembly mounted to the entry housing of a flow-meter.

Referring to FIG. 1, a meter of this invention is shown having an outer and fluid tight housing A divided into confronting exit housing 14 and entry housing 16 joined by screws 18. Typically, separating plate 22, which has a pair of holes (not shown) through its thickness for the passage of air, is captured between exit and entry housings 14 and 16. Likewise, a diaphragm B is captured.

In operation, air flows into the valve at inlet 30 and passes into the valve housing on side 32 of diaphragm B. In passing through the valve, air passes through the holes in plate 22 and through an aperture C, to side 34 of diaphragm B. Air then passes out of the meter through a valve outlet 40 in exit housing 14.

Displacement of diaphragm B occurs against a spring force provided by helical spring D. Helical spring D at its bottom portion rests against diaphragm B. At its upper portion, helical spring D rests against an aperture stop 41. Stop 41 is threadably engaged interior of a threaded aperture 42. As can be seen by adjustably placing threaded stop 41 along threaded aperture 42, adjustment may be made to the helical spring D and the force that it exerts on diaphragm B.

A variable density filter F is mounted between a light source filter and sensor G, the light source and sensor herein only being schematically shown. By the expedient of tailoring the light source filter and sensor as disclosed in U.S. Pat. No. 4,007,628 at FIG. 5 and related text, a signal indicating diaphragm displacement can be generated from within housing A. This signal can be measured remotely to indicate mass flow rate at the meter.

Having set forth the general operation of the meter, attention can now be directed to set forth how the diaphragm changes the effective size of the meter aperture with excursion along the length of the needle.

Referring to FIG. 2, diaphragm B is captured between a washer 50 and a second washer 52. A sensor plate 26 is captured between the bottom surface of washer 50 and the outwardly extending flange 53, such flange 53 formed at the bottom of a threaded cylinder 54. A nut 57 is threaded over threaded cylinder 54 thereby forcing washer 52 against diaphragm B against washer 50 against plate 26 against lip 53. Diaphragm B is thus compressed between washer 52 and flange 50 resulting in secure fastening.

Diaphragm B at its central aperture—through which cylinder 54 passes—travels up and down needle N. During such excursion, cylinder 54 must coact with needle N to define a changing aperture size. The definition of this changing aperture size can now be understood.

Needle N is cylindrical in shape. Typically, the needle at its base end is implanted within a needle stem 60. From stem 60, needle N extends upwardly and has the same general circular cross-section from one end thereof to the other.

The needle N is formed with a slot 70. Slot 70 here shown is linear in slope and starts at portion 72 of the needle adjacent to stem 60. From portion 72, slot 70 gradually slopes and tapers to and towards end 74. With increasing length along needle N, the depth of the slot 70 likewise increases.

Referring to FIG. 3b, the valve assembly may be more clearly understood. Specifically, stem 60 at threads 62 is configured for adjustable mounting to entry housing 16 at threaded aperture 63 (see FIG. 1). Movement of the needle N upwardly and downwardly within housing A can occur. Needle N is in itself adjustable along stem 60. Specifically, needle N is threadedly mounted at main cylindrical threads 65 for movement upwardly and downwardly of stem 60.

In the system maintaining needle N in a preset position, there is provided a rubber washer 67 in an annulus 68. This washer 67 inhibits rotation of needle N.

The innermost needle adjustment includes a threadedly mounted adjustment needle 80. Needle 80 is adjustably movable along a partially threaded cylindrical passage configured along the length of the needle N. By the expedient of inserting a screwdriver and rotating needle 80, movement into and out of slot 70 by the needle 80 can occur. Other configurations of adjustment needle 80 are possible. For example, adjustment needle 80 could be partially of square cross-section or it could have slots formed longitudinally along its length.

It will be seen that slot 70 has its cross-section interrupted by the penetration of needle 80. This penetration of needle 80 is adjustable and can be manipulated so that its penetration into the slot 70 can be tailored. It is clear from the above that the operation of the invention would not be sensibly altered if the positions of needle N and cylinder 54 are interchanged; that is, needle N and adjustment screw 80 affixed to moving assembly comprised of parts 26, 50, 52, 53 and B; and cylinder 54 affixed to adjustable part 60.

The invention also provides for a calibration assembly K, as shown at FIG. 7, which is mounted to the entrance end 16 of housing A. Turning to FIG. 8, assembly K is shown to include first, second and third adjustors 84, 86 and 88 mounted within adapter 90.

Adapter 90 is a hollow cylindrical member with threads formed on one end for threadable engagement with inlet 30 (see FIG. 1). First adjustor 84 is also a hollow cylindrical member which is sized for rotatable and slidable engagement within adapter 90. Second adapter 86 is similar to first adapter 84 and is sized for rotatable and slidable engagement within first adapter 84. Third adapter 88 is a solid cylindrical member sized for rotatable and slidable engagement within second adjustor 86. Adjustors 84, 86 and 88 each have enlarged grasping ends. Adjustors 84, 86 and 88 also have tip ends formed for insertion within complementarily shaped slots 6, 8 and 10 formed within the ends of stem 60, needle N and adjustment needle 80 respectively. These slots are best shown at FIGS. 3A and 4B. Sealing is provided by O-rings 94, 96, 98, 100 seated within respective groves. A radially directed threaded aperture 38, shown threadably engaged with an air hose fitting 36, in adapter 90 allows air to enter the meter. A relatively wide circular groove is formed about the outside of first adjustor 84. This groove allows air to pass from radially directed aperture 38, into the goove, through a number of holes 89 formed within first adjustor 84, between the outside of adjustor 86 and the inside of adjustor 84, into entry housing 16.

Thus, with calibration assembly K mounted to the flow meter, the user can adjust the axial placement of needle stem 60, needle N and adjustment needle 80 using adjustors 84, 86 and 88 while the meter is operating. Simplified calibration results.

Other needle configurations are illustrated in FIGS. 4A, 4B, 5A and 5B. It may also be desired, depending upon the characteristics of the other components used, to alter or modify the shape of adjustment needle 80.

Having set forth the configuration of the needle N, attention can now be directed to FIG. 6, which figure is a graphical representation of mass flow rate against diaphragm displacement. Specifically and where slot M such as that illustrated in FIGS. 3a, 3b is configured within a needle N lacking an adjustment needle 80, flow rate occurs in accordance with some curve such as the solid line curve 102. It will be noticed that when the higher mass flow rates and displacements are encountered, a deviation from a desired curve 104 occurs. Specifically, this deviation occurs at portion 102a of the curve.

Adjustment to this curve is increasingly being made by tightening the spring bias. As heretofore by movement of aperture stop 41 downwardly to and towards diaphragm B (see FIG. 1), a flattening of the upper portion of the curve occurs. This is shown by the broken line curve 103a.

Unfortunately tightening of the spring bias induces another deviation from the desired curve. This deviation is shown by the lower segment 103b of broken line curve 103. Specifically, this non-linearity causes displacement errors at particular mass flow rates. Further, tightening the spring bias to improve performance at higher flow rates, results in a loss of performance at the lower flow rates. This loss of performance translates to erroneous flow rate readings by the meter.

When the adjustment needle is provided, solid curve 102 becomes corrected by the amount shown by the dotted line 104. This correction results in the improved flow rate measurement possible with this invention.

Although the best mode contemplated for carrying out the present invention has been herein shown and describe, it will be apparent that modification and variation may be made without departing from what is regarded to be the subject of the invention.

What is claimed is:

1. A remote volume flow meter of the type including a housing having an inlet and an outlet for communication of air therethrough, a biased movable diaphragm positioned across the air flow having a centrally located hole, a needle positioned within said hole, said needle configured with a passageway to allow air to pass from one side of the diaphragm to the other side of the diaphragm, and means for producing an electric signal responsive to the position of said diaphragm, the improvement comprising:
   means for mounting said needle to said housing;
   said passageway having a varying cross-section; and
   means for adjustably inserting an adjustment needle centrally within said passageway whereby the desired relationship between the mass flow rate through the meter and the displacement of the diaphragm is achieved.

2. The invention of claim 1 wherein said mounting means is an adjustable mounting means so that said needle is adjustably mounted to said mounting means.

3. The invention of claim 1 further comprising means for adjusting the axial position of said mounting means within said housing.

4. The invention of claim 1 wherein said passageway further comprises:
   a central bore housing said adjustment needle; and
   a tapered slot, said slot increasing in cross-section towards the free end of said needle.

5. The invention of claim 4 wherein there is more than one tapered slot.

6. The invention of claim 1 further comprising means for adjusting the axial position of said adjustment needle while said meter is operating.

7. The invention of claim 2 further comprising means for adjusting the axial position of said needle while said meter is operating.

8. The invention of claim 3 further comprising means for adjusting the axial position of said mounting means while said meter is operating.

9. The invention of claim 2 further comprising means for adjusting said mounting means, said needle, and said adjustment needle while said meter is operating.

10. A flow meter for measuring the flow of air comprising:
   a housing having an entrance and an exit;
   a biased movable diaphragm mounted within said housing between the entrance and the exit, said diaphragm having a hole formed therein;
   means for electrically sensing displacement of said diaphragm;
   means for mounting a needle to said housing, said needle passing through said hole in said diaphragm;

said needle defining a slot formed longitudinally along the side of said needle so that air can pass from one side of said diaphragm to the other side of diaphragm;

said needle further defining a central bore extending along the length of said needle;

an adjustment needle movable along said needle, said adjustment needle movable relative to said needle to modify the flow area between said needle and diaphragm opening; and means for adjustably positioning said adjustment needle along said central bore whereby the output of said sensing means is generally directly proportional to the flow rate through said meter.

11. The invention of claim 10 wherein said slot varies in cross-section along at least a part of the length of said slot.

12. The invention of claim 10 wherein said bore is of circular cross-section and said adjustment needle is sized for complementary slidable engagement.

13. The invention of claim 10 wherein said mounting means is adjustable so that said needle is adjustably mounted to said mounting means.

14. The invention of claim 13 further comprising means for adjusting the axial position of said mounting means within said housing.

15. The invention of claim 14 further comprising means for adjusting the position of said needle and of said adjustment needle and of said mounting means while said meter is operating so that said meter can be calibrated while said meter is operating.

16. The invention of claim 10 wherein said needle defines two or more slots.

* * * * *